US009359002B2

(12) United States Patent
Tanaka et al.

(10) Patent No.: US 9,359,002 B2
(45) Date of Patent: Jun. 7, 2016

(54) STEERING-COLUMN DEVICE

(71) Applicants: JTEKT CORPORATION, Osaka-shi, Osaka (JP); TOYOTA JIDOSHA KABUSHIKI KAISHA, Toyota-shi, Aichi (JP)

(72) Inventors: Eiji Tanaka, Kitakatsuragi-gun (JP); Hiroyuki Yao, Okazaki (JP); Shunsuke Nunomura, Kashihara (JP); Yoshito Fujita, Nagoya (JP)

(73) Assignees: JTEKT CORPORATION, Osaka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/799,122

(22) Filed: Jul. 14, 2015

(65) Prior Publication Data
US 2015/0314802 A1 Nov. 5, 2015

Related U.S. Application Data

(63) Continuation of application No. PCT/JP2014/051924, filed on Jan. 29, 2014.

(30) Foreign Application Priority Data

Jan. 30, 2013 (JP) ................................ 2013-015796
Jun. 11, 2013 (JP) ................................ 2013-123177

(51) Int. Cl.
*B62D 1/19* (2006.01)
*B62D 1/189* (2006.01)
(52) U.S. Cl.
CPC ................ *B62D 1/195* (2013.01); *B62D 1/189* (2013.01)

(58) Field of Classification Search
CPC ................................. B62D 1/195; B62D 1/189
See application file for complete search history.

(56) References Cited

U.S. PATENT DOCUMENTS 4,022,495 A * 5/1977 Pizzocri ................. B62D 1/195
188/268
4,786,076 A 11/1988 Wierschem
(Continued)

FOREIGN PATENT DOCUMENTS

EP  2700560 A1  2/2014
JP  H08-72728 A  3/1996
(Continued)

OTHER PUBLICATIONS

Mar. 18, 2014 International Search Report issued in International Patent Application No. PCT/JP2014/051923.
(Continued)

*Primary Examiner* — Drew Brown
(74) *Attorney, Agent, or Firm* — Oliff PLC

(57) ABSTRACT

A steering device includes a fixed bracket which includes a first plate, a movable jacket which rotatably supports a steering shaft, a movable bracket which includes a second plate, a suspension mechanism and a resin pin. The suspension mechanism includes a suspension shaft connecting the first plate and the second plate, and is configured to move in a column movement direction along with the second plate at the time of the secondary collision. The resin pin is inserted into a first hole provided in the first plate and a second hole provided in the second plate, and is configured to be broken at the time of the secondary collision. The resin pin has a predetermined amount of play in a direction orthogonal to the column movement direction with respect to at least one of the first hole and the second hole.

5 Claims, 10 Drawing Sheets

(56) References Cited

U.S. PATENT DOCUMENTS

| | | | |
|---|---|---|---|
| 4,943,028 A | 7/1990 | Hoffmann et al. | |
| 5,074,161 A | 12/1991 | Hancock | |
| 5,899,116 A | 5/1999 | Armstrong et al. | |
| 6,186,697 B1 | 2/2001 | Masuda et al. | |
| 7,651,132 B2 | 1/2010 | Cho et al. | |
| 9,010,806 B2* | 4/2015 | Tanaka | B62D 1/195 280/777 |
| 9,016,722 B2 | 4/2015 | Yachida et al. | |
| 2003/0155760 A1 | 8/2003 | Laisement et al. | |
| 2004/0169364 A1 | 9/2004 | Hayashi et al. | |
| 2005/0200113 A1* | 9/2005 | Cymbal | B62D 1/195 280/777 |
| 2008/0012281 A1 | 1/2008 | Cho et al. | |
| 2008/0236326 A1 | 10/2008 | Matsui et al. | |
| 2008/0284150 A1 | 11/2008 | Yamada | |
| 2009/0249916 A1 | 10/2009 | Ridgway et al. | |
| 2012/0112443 A1 | 5/2012 | Arakawa et al. | |
| 2012/0169035 A1* | 7/2012 | Minamigata | B62D 1/195 280/777 |
| 2012/0187669 A1 | 7/2012 | Minamigata et al. | |
| 2012/0267884 A1* | 10/2012 | Fujiwara | B62D 1/195 280/777 |
| 2012/0291585 A1* | 11/2012 | Minamigata | B62D 1/195 74/493 |
| 2012/0299281 A1* | 11/2012 | Fujiwara | B62D 1/195 280/777 |
| 2012/0318092 A1* | 12/2012 | Kuroumaru | B62D 1/195 74/492 |
| 2013/0133460 A1 | 5/2013 | Uesaka | |
| 2013/0160592 A1 | 6/2013 | Shibazaki et al. | |
| 2014/0053677 A1* | 2/2014 | Sakata | B62D 1/195 74/493 |
| 2014/0246848 A1 | 9/2014 | Yachida et al. | |
| 2015/0069746 A1 | 3/2015 | Oishi et al. | |
| 2015/0090066 A1 | 4/2015 | Hoshino | |
| 2015/0314802 A1 | 11/2015 | Tanaka et al. | |

FOREIGN PATENT DOCUMENTS

| | | |
|---|---|---|
| JP | H08-301128 A | 11/1996 |
| JP | H10-258646 A | 9/1998 |
| JP | 2004-203141 A | 7/2004 |
| JP | 2005-219641 A | 8/2005 |
| JP | 2008-018920 A | 1/2008 |
| JP | 2008-308156 A | 12/2008 |
| JP | 2012-121538 A | 6/2012 |
| JP | 2012-131444 A | 7/2012 |
| JP | 2012-158290 A | 8/2012 |
| JP | 2012-240628 | 9/2012 |
| JP | 2014-166841 A | 9/2014 |
| WO | 2011/158787 A1 | 12/2011 |
| WO | 2014/119608 A1 | 8/2014 |

OTHER PUBLICATIONS

Mar. 18, 2014 International Search Report issued in International Patent Application No. PCT/JP2014/051924.

Mar. 18, 2014 International Search Report issued in International Patent Application No. PCT/JP2014/052037.

U.S. Appl. No. 14/759,583, filed Jul. 7, 2015 in the name of Tanaka et al.

U.S. Appl. No. 14/759,312, filed Jul. 6, 2015 in the name of Tanaka et al.

Dec. 4, 2015 Notice of Allowance issued in U.S. Appl. No. 14/759,312.

Jan. 6, 2015 International Search Report issued in International Patent Application No. PCT/IB2014/001403.

Jan. 28, 2016 Extended European Search Report issued in European Patent Application No. 14746219.6.

Feb. 4, 2016 Search Report issued in European Patent Application No. 14745693.3.

Jan. 29, 2016 Extended European Search Report issued in European Patent Application No. 14746254.3.

Feb. 3, 2016 Notice of Allowance issued in U.S. Appl. No. 14/759,312.

* cited by examiner

STEERING-COLUMN DEVICE

CROSS REFERENCE TO RELATED APPLICATIONS

This application is a continuation of PCT application No. PCT/JP2014/051924, which was filed on Jan. 29, 2014 based on Japanese Patent Application (No. 2013-015796) filed on Jan. 30, 2013 and Japanese Patent Application (No. 2013-123177) filed on Jun. 11, 2013. The contents of Japanese Applications are incorporated herein by reference.

BACKGROUND

The present invention relates to a steering device.

Concerning a steering device, a primary collision in which a vehicle hits another vehicle is followed by a secondary collision in which a driver hits a steering wheel. In order to absorb impact at the time of the secondary collision, there are proposed various structures which separate a portion of a steering column from a vehicle body and move the steering column in a column shaft direction.

For example, in FIG. 9 of Patent Document 1, a pair of locking cutouts extending parallel to a column shaft direction is provided in a vehicle body-side bracket fixed to a vehicle body. A column-side bracket is supported through a pair of locking capsules respectively held in the respective locking cutouts by a plurality of locking pins. Each of the locking capsules is coupled and fixed to the column-side bracket through bolts which are inserted into each locking cutout.

The plurality of locking pins for holding the pair of locking capsules includes inner two rows of locking pins which are disposed between the pair of locking cutouts and extend parallel to the column shaft direction, and outer two rows of locking pins which are disposed on both sides with the pair of locking cutouts interposed therebetween in relation to a direction (equivalent to a width direction of a vehicle) orthogonal to the column shaft direction and extend parallel to the column shaft direction.

At the time of the secondary collision, the plurality of locking pins holding each locking capsule is broken, whereby each locking capsule is separated from a corresponding locking cutout, and thus the locking capsule and a column bracket move together in the column shaft direction.

[Patent Document 1] JP 2012-121538 A

SUMMARY

If impact in a lateral direction is applied during assembly or during transportation before assembly, there is a concern that, for example, a portion of the locking pin made of resin may be damaged. For this reason, there is a concern that variation in a separation load at time of the secondary collision may occur.

Further, in a case where shearing occurs in a stepped portion of the locking pin at the time of the secondary collision, an element functioning as a blade for shearing the locking pin becomes a single location coming into contact with a small-diameter portion of the stepped portion, and thus a force which bends the locking pin is generated, and therefore, a shearing position is not stable. For this reason, variation in a shearing area occurs, and thus there is a concern that variation in a separation load may occur.

Therefore, an object of the present invention is to provide a steering device in which it is possible to suppress variation in a separation load at the time of a secondary collision.

According to one advantageous aspect of the present invention, there is provided a steering device comprising:

a fixed bracket which includes a first plate fixed to a vehicle body-side member;

a movable jacket which rotatably supports a steering shaft having a steering member connected to one end of the steering shaft;

a movable bracket which supports the movable jacket so as to move in a column movement direction along with the movable jacket at the time of a secondary collision and includes a second plate facing the first plate;

a suspension mechanism which includes a suspension shaft connecting the first plate and the second plate, thereby suspending the movable jacket through the movable bracket, and is configured to move in the column movement direction along with the second plate at the time of the secondary collision; and a resin pin which is inserted into a first hole provided in the first plate and a second hole provided in the second plate, thereby connecting the first plate and the second plate, and is configured to be broken at the time of the secondary collision so as to separate the second plate from a predetermined position of the first plate, wherein the resin pin has a predetermined amount of play in a direction orthogonal to the column movement direction with respect to at least one of the first hole and the second hole.

The second hole may have a cross-sectional shape of an arc shape in at least an area on a side opposite to the column movement direction side.

The resin pin may include a columnar portion having a straight cross-sectional shape, and the columnar portion may extend over the first hole and the second hole.

The steering device may further comprise a collar which is fitted onto the columnar portion and inserted into the first hole.

The collar may include an inner periphery which has a circular cross section and is fitted onto an outer periphery of the columnar portion, an outer periphery facing an inner periphery of the first hole, and an end portion in an axial direction, which comes into contact with a peripheral edge of the second hole of the second plate.

The steering device may further comprise: a first collar which includes an inner periphery that is fitted onto an outer periphery of the columnar portion, and an outer periphery facing an inner periphery of the first hole; and a second collar which includes an inner periphery that is fitted onto the outer periphery of the columnar portion, and an outer periphery that is fitted onto an inner periphery of the second hole, wherein the first collar and the second collar include end portions in the axial direction, which come into contact with each other.

DETAILED DESCRIPTION OF EXEMPLIFIED EMBODIMENTS

Preferred embodiments of the present invention will be described with reference to the accompanying drawings.

Figure 1:
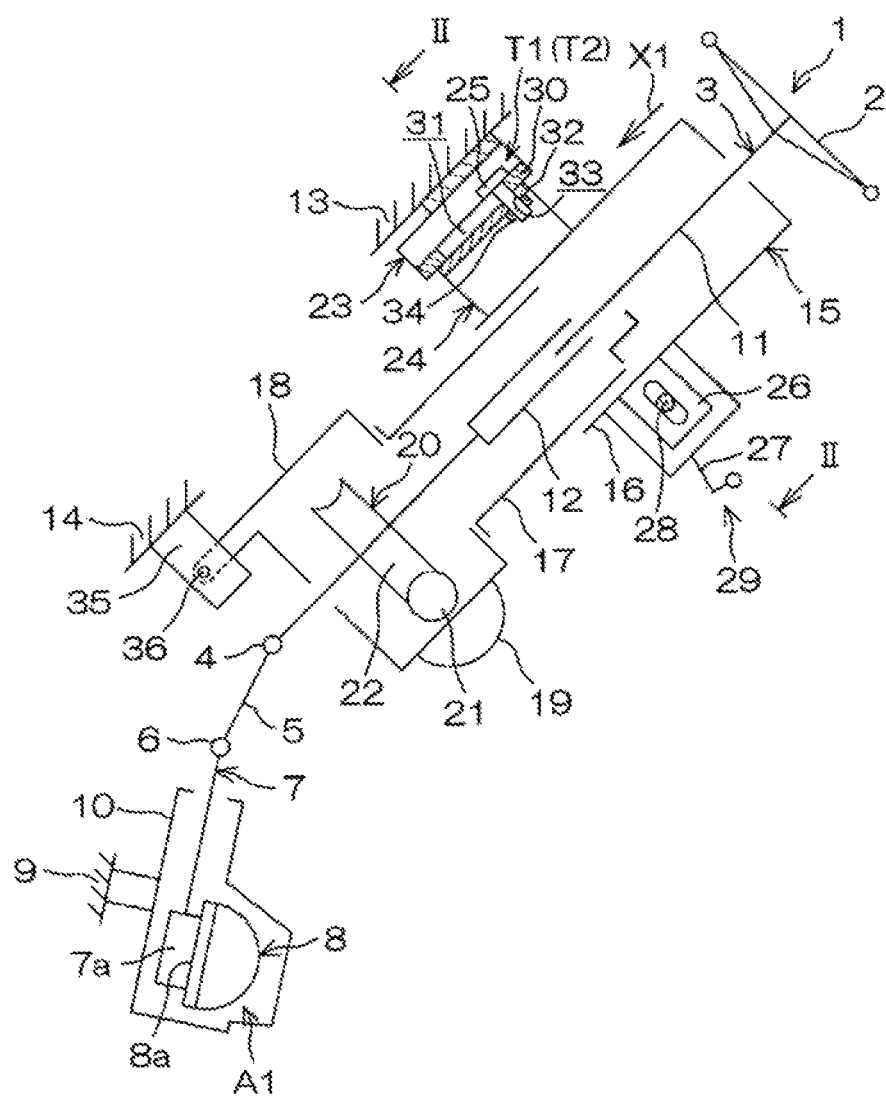
FIG. 1 is a schematic side view of a steering device of a first embodiment of the present invention and shows a schematic configuration of the steering device.

FIG. 1 is a schematic diagram showing a schematic configuration of a steering device of a first embodiment of the present invention. Referring to FIG. 1, a steering device 1 is provided with a steering shaft 3 connected to a steering member 2 such as a steering wheel, an intermediate shaft 5 connected to the steering shaft 3 through a universal joint 4, a pinion shaft 7 connected to the intermediate shaft 5 through a universal joint 6, and a rack shaft 8 as a steering shaft having a rack 8a which meshes with a pinion 7a provided in the vicinity of an end portion of the pinion shaft 7.

A steering mechanism A1 is configured with a rack-and-pinion mechanism which includes the pinion shaft 7 and the rack shaft 8. The rack shaft 8 is supported by a housing 10 fixed to a vehicle body-side member 9, so as to be able to move in a shaft direction (a direction orthogonal to the plane of the drawing) along a rightward-leftward direction of a vehicle. Although not shown in the drawings, each end portion of the rack shaft 8 is connected to a corresponding steering wheel through a corresponding tie rod and a corresponding knuckle arm.

The steering shaft 3 has an upper shaft 11 and a lower shaft 12 connected so as to be able to rotate together and to be able to relatively move in an axial direction, by using, for example, spline coupling. The steering shaft 3 is rotatably supported by a steering column 15 fixed to vehicle body-side members 13 and 14, through a bearing (not shown).

The steering column 15 is provided with a tubular upper jacket 16 (a movable jacket) fitted so as to be able to relatively move in the axial direction, a tubular lower jacket 17, and a housing 18 connected to a lower end in the axial direction of the lower jacket 17. A deceleration mechanism 20 which slows down the power of an electric motor 19 for steering assistance and transmits the reduced power to the lower shaft 12 is accommodated in the housing 18. The deceleration mechanism 20 has a drive gear 21 connected to a rotary shaft (not shown) of the electric motor 19 so as to be able to rotate together, and a driven gear 22 which meshes with the drive gear 21 and rotates together with the lower shaft 12.

In this embodiment, a description is made based on an example in which the present invention is applied to an electric power steering device. However, the present invention may be applied to a manual steering device. Further, in this embodiment, a description is made based on a case where the steering device 1 is tilt-adjustable. However, the present invention may be applied to a steering device which does not have a tilt adjustment function, and may also be applied to a tilt-adjustable and telescopic adjustable steering device.

Figure 2:
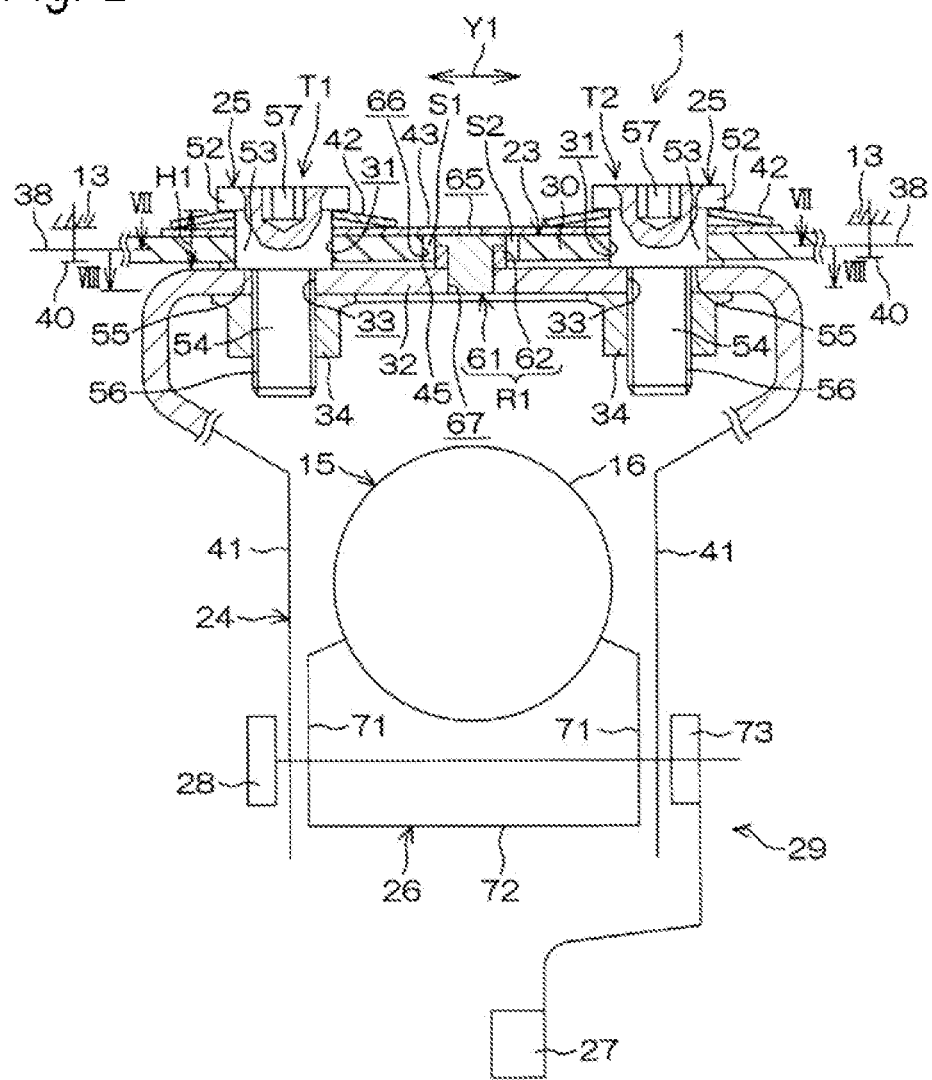
FIG. 2 is a schematic cross-sectional view of the steering device of FIG. 1 and shows a cross section along line II-II of FIG. 1.

As shown in FIG. 2 which is a schematic cross-sectional view, the steering device 1 is provided with a pair of suspension mechanisms T1 and T2 which is supported by a fixed bracket 23 and suspends the upper jacket 16 through a tilt bracket 24 as a movable bracket. The suspension mechanisms T1 and T2 move along with the tilt bracket 24 and the upper jacket 16 in a column movement direction X1 (refer to FIG. 1, and in FIG. 2, a direction orthogonal to the plane of the drawing) at the time of the secondary collision.

That is, as shown in FIGS. 1 and 2, the tilt bracket 24 as the movable bracket is suspended on the fixed bracket 23 fixed to the vehicle body-side member 13, through suspension bolts 25 as suspension shafts of the pair of suspension mechanisms T1 and T2. On the other hand, a column bracket 26 is fixed to the upper jacket 16 of the steering column 15.

As shown in FIGS. 1 and 2, the steering device 1 is provided with a locking mechanism 29 which locks the position of the column bracket 26 after the tilt adjustment (eventually, the positions of the upper jacket 16 and the steering member 2), through the tilt bracket 24 by a tightening shaft 28, or releases the locking, according to an operation of an operating lever 27.

Figure 3:
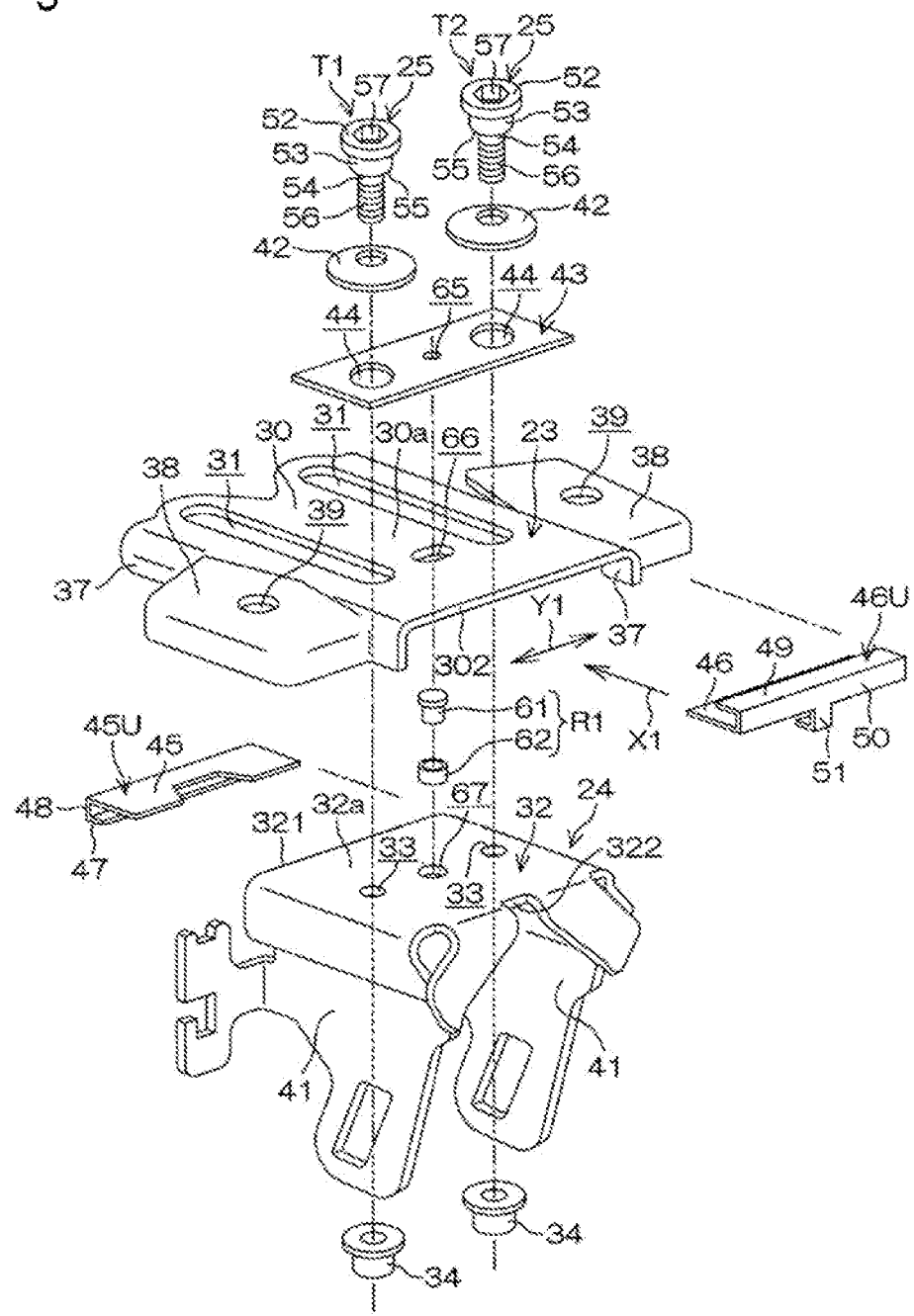
FIG. 3 is an exploded perspective view of the steering device of FIG. 1.

As shown in FIGS. 2 and 3, the tilt bracket 24 is provided with a pair of side plates 41, and as shown in FIG. 2, the column bracket 26 has a groove shape and is provided with a pair of side plates 71 respectively facing the pair of side plates 41 of the tilt bracket 24, and a connection plate 72 connecting the lower ends of the pair of side plates 71.

Referring to FIG. 2, the tightening shaft 28 is composed of a bolt which penetrates the side plates 41 and 71 of the tilt bracket 24 and the column bracket 26. By rotating a nut 73 which is screwed onto the tightening shaft 28 by a rotating operation of the operating lever 27, both the side plates 41 and 71 are tightened between a head portion of the bolt as the tightening shaft 28 and the nut 73, and thus both the side plates 41 and 71 are locked. In this way, the position of the steering member 2 after the tilt adjustment is locked, and thus tilt locking is achieved.

Figure 5:
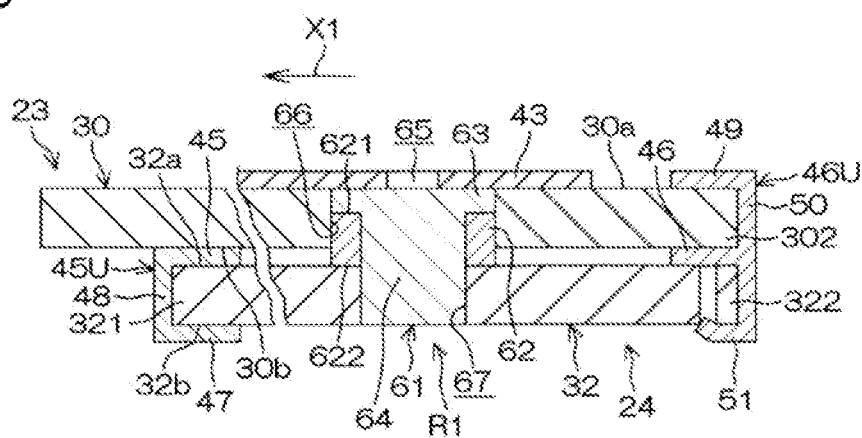
FIG. 5 is a cross-sectional view of a connection state of a first plate and a second plate in the first embodiment and shows a cross section in a frontward-rearward direction which includes the axis of a resin pin.
Figure 6:
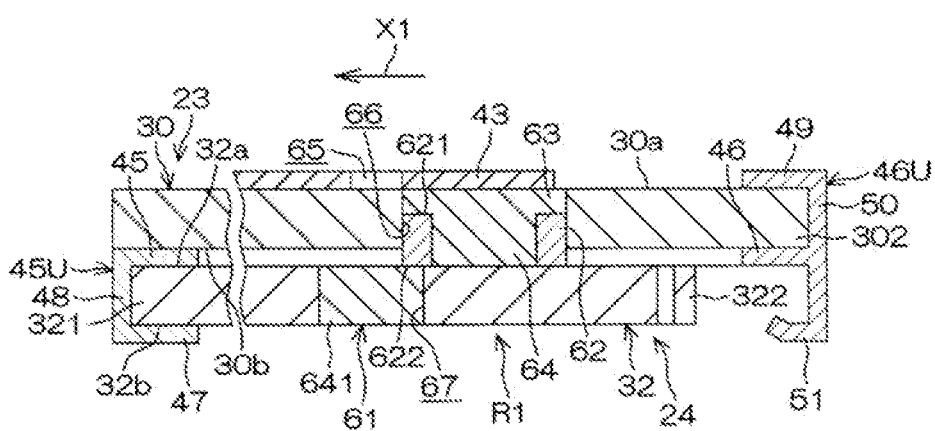
FIG. 6 is a cross-sectional view of the first plate and the second plate at the time of a secondary collision in the first embodiment and shows a state where the second plate has been separated in a column movement direction from a predetermined position of the first plate due to shearing of the resin pin.

Further, the steering device 1 is provided with a connection and separation mechanism R1 which connects a first plate 30 of the fixed bracket 23 and a second plate 32 of the tilt bracket 24 and separates, at the time of the secondary collision, the second plate 32 from a predetermined position (a position shown in FIG. 5) of the first plate 30 in the column movement direction X1, as shown in FIG. 6.

Figure 4:
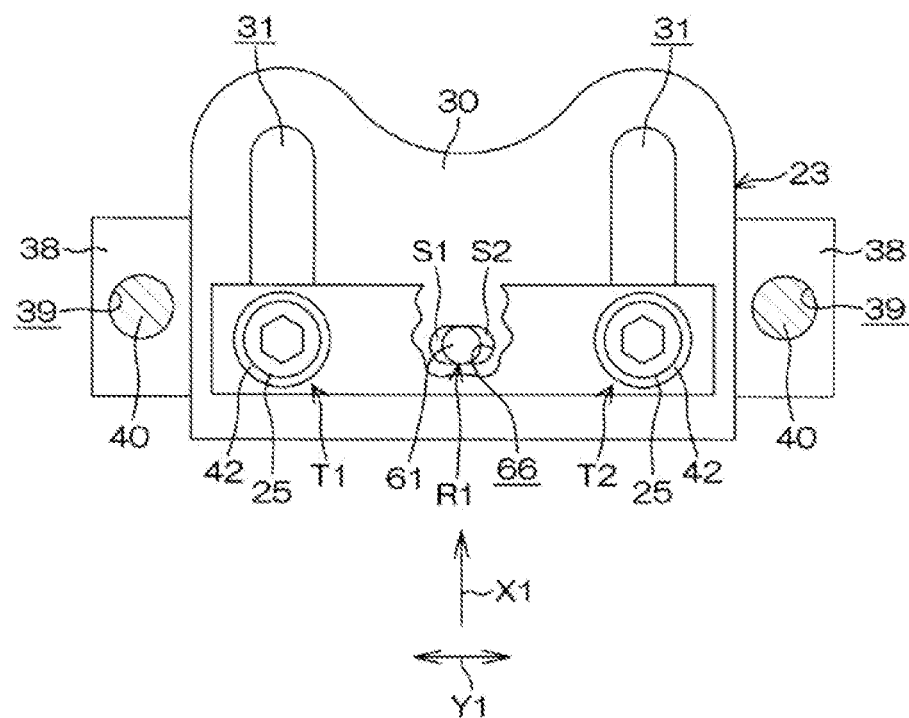
FIG. 4 is a partial cutaway schematic plan view of a fixed bracket, a pair of suspension mechanisms, and a connection and separation mechanism in the first embodiment.

As shown in FIG. 2 and FIG. 4 which is a partial cutaway schematic plan view, the connection and separation mechanism R1 is disposed between the pair of suspension mechanisms T1 and T2 (that is, between a pair of elongated holes 31 (described later) of the first plate 30 of the fixed bracket 23) in relation to a direction Y1 orthogonal to the column movement direction X1. Specifically, the connection and separation mechanism R1 is disposed at the middle position between the pair of elongated holes 31 (that is, between a pair of the suspension bolts 25) in relation to the direction Y1 orthogonal to the column movement direction X1.

Referring to FIG. 1, the fixed bracket 23 is provided with the first plate 30 which is parallel to the column movement direction X1 at the time of the secondary collision (equivalent to the axial direction of the steering shaft 3). The elongated holes 31 for the suspension mechanisms T1 and T2, which extend parallel to the column movement direction X1, are formed in the first plate 30. On the other hand, the tilt bracket 24 (the movable bracket) is provided with the second plate 32 facing the first plate 30. Round holes 33 for the suspension mechanisms T1 and T2, each of which faces a portion of the elongated hole 31, are formed in the second plate 32.

The suspension bolt 25 is configured with a bolt which is inserted into the elongated hole 31 of the first plate 30 and the round hole 33 of the second plate 32 and is screwed into a nut 34. The suspension bolt 25 which connects the first plate 30 and the second plate 32 in cooperation with the nut 34 suspends the upper jacket 16 (the movable jacket) through the tilt bracket 24 (the movable bracket) and the column bracket 26. Further, the suspension bolt 25 can move in the column movement direction X1 along the elongated hole 31 along with the tilt bracket 24 (the movable bracket), the column bracket 26, and the upper jacket 16 at the time of the secondary collision.

A lower bracket 35 fixed to the vehicle body-side member 14 supports a tilt center shaft 36 which is a pivot shaft. The tilt center shaft 36 supports the lower jacket 17 through the housing 18 of the steering column 15 so as to be able to swing around the tilt center shaft 36.

As shown in FIGS. 2 and 3, each of the suspension mechanisms T1 and T2 is configured with the suspension bolt 25, a leaf spring 42 which is composed of, for example, a disc spring, the nut 34, and the like. The connection and separation mechanism R1 is configured with a resin pin 61 which is shorn at the time of the secondary collision, and a cylindrical collar 62 fitted onto a portion in the axial direction of the resin pin 61. The collar 62 is formed of a material (for example, metal such as iron or aluminum, high-hardness resin, ceramic, or the like) having a higher hardness than the resin forming the resin pin 61.

Referring to FIG. 3, the fixed bracket 23 is provided with a pair of side plates 37 respectively provided to extend downward from a pair of side edges of the first plate 30, and a pair of mounting plates 38 respectively provided to extend toward the outside from the pair of side plates 37. The fixed bracket 23 is formed of, for example, sheet metal. Each of the mounting plates 38 is fixed to the vehicle body-side member 13 by a fixing bolt 40 (refer to FIG. 4) inserted into a threaded insertion hole 39 (refer to FIGS. 3 and 4) provided in each of the mounting plates 38. In this way, the fixed bracket 23 is fixed to the vehicle body-side member 13.

Referring to FIGS. 2 to 4, in the first plate 30 of the fixed bracket 23, a pair of the elongated holes 31 is provided corresponding to the pair of suspension bolts 25. The pair of elongated holes 31 extends parallel to the column movement direction X1 at the time of the secondary collision and is spaced apart from each other in the direction Y1 orthogonal to the column movement direction X1.

As shown in FIGS. 2 and 3, the tilt bracket 24 (the movable bracket) is formed of, for example, sheet metal. The tilt bracket 24 is provided with the second plate 32 and the pair of side plates 41 provided to extend downward from a pair of side edges of the second plate 32 and has a groove shape. A connection portion between the second plate 32 and each of the side plates 41 may be formed in a curved shape, as shown in FIGS. 2 and 3.

In the second plate 32 of the tilt bracket 24, a pair of the round holes 33 is provided corresponding to the pair of suspension bolts 25. Each of the suspension bolts 25 is sequentially inserted into the annular leaf spring 42 which is composed of, for example, a disc spring, a corresponding insertion hole 44 of a first interposition plate 43, a corresponding elongated hole 31 of the first plate 30, and a second corresponding round hole 33 of the second plate 32 and is screwed into the nut 34. In this way, the suspension bolts 25 suspend the tilt bracket 24.

The first interposition plate 43 is composed of an elongated plate which extends in the direction Y1 orthogonal to the column movement direction X1, as shown in FIGS. 3 and 4, and is interposed between both the leaf springs 42 and an upper surface 30a of the first plate 30, as shown in FIG. 2. The surface on at least the first plate 30 side of the first interposition plate 43 is configured with a low-friction material such as fluorine resin, for example. That is, the entirety of the first interposition plate 43 may be configured with a low-friction material, and the surface on the first plate 30 side of the first interposition plate 43 may be coated with a low-friction material.

A second interposition plate 45 and a third interposition plate 46 which serve to reduce sliding resistance when the second plate 32 moves in the column movement direction X1 with respect to the first plate 30 at the time of the secondary collision are interposed between the first plate 30 and the second plate 32.

The second interposition plate 45 configures a groove-shaped unit 45U which is locked to a first end portion 321 which is an end portion on the column movement direction X1 side of the second plate 32. That is, the unit 45U is provided with the second interposition plate 45 along an upper surface 32a of the second plate 32 and a lower surface 30b of the first plate 30, a facing plate 47 facing the second interposition plate 45 and along a lower surface 32b of the second plate 32, and a connection plate 48 connecting the second interposition plate 45 and the facing plate 47 and coming into contact with an end edge on the column movement direction X1 side of the second plate 32.

The surface on at least the first plate 30 side of the second interposition plate 45 is configured with a low-friction material such as fluorine resin, for example. That is, the second interposition plate 45 or the unit 45U may be configured with a low-friction material, and the surface on the first plate 30 side of the second interposition plate 45 may be coated with a low-friction material.

The third interposition plate 46 configures a unit 46U which is locked to a second end portion 302 which is an end portion on the side opposite to the column movement direction X1 side of the first plate 30, and a second end portion 322 which is an end portion on the side opposite to the column movement direction X1 side of the second plate 32. That is, the unit 46U is provided with the third interposition plate 46 along the upper surface 32a of the second plate 32 and the lower surface 30b of the first plate 30, and a facing plate 49 facing the third interposition plate 46 and along the upper surface 30a of the first plate 30. Further, the unit 46U is provided with a connection plate 50 connecting the third interposition plate 46 and the facing plate 49 and coming into contact with an end edge on the side opposite to column movement direction X1 side of the first plate 30, and a locking portion 51 having, for example, unciform hook shape, which is hooked and locked to the second end portion 322 of the second plate 32.

The surface on at least the second plate 32 side of the third interposition plate 46 is configured with a low-friction material such as fluorine resin, for example. That is, the third interposition plate 46 or the unit 46U may be configured with a low-friction material, and the surface on the second plate 32 side of the third interposition plate 46 may be coated with a low-friction material.

As shown in FIGS. 2 and 3, each of the suspension bolts 25 is provided with a head portion 52, a large-diameter portion 53 which is continuous to the head portion 52 and has a smaller diameter than the head portion 52, a small-diameter portion 54 which is continuous to the large-diameter portion 53 and has a smaller diameter than the large-diameter portion 53, a stepped portion 55 formed between the large-diameter portion 53 and the small-diameter portion 54, and a threaded portion 56 provided in the small-diameter portion 54. A tool engagement portion 57 having, for example, a hexagonal hole shape is provided in the head portion 52.

As shown in FIG. 2, the large-diameter portion 53 is inserted into the annular leaf spring 42, the insertion hole 44 of the first interposition plate 43, and the elongated hole 31 of the first plate 30. The stepped portion 55 comes into contact with the upper surface 32a of the second plate 32 and is received by the upper surface 32a. The second plate 32 is pinched between the stepped portion 55 and the nut 34, and thus the suspension bolt 25 and the second plate 32 are fixed to each other.

A distance H1 (equivalent to the shaft length of the large-diameter portion 53) between the head portion 52 and the stepped portion 55 is made to be larger than the sum of the plate thickness of the second interposition plate 45 (or the plate thickness of the third interposition plate 46) which is interposed between the first plate 30 and the second plate 32, the plate thickness of the first plate 30, the plate thickness of the first interposition plate 43 along the upper surface 30a of the first plate 30, and the plate thickness of the leaf spring 42 at the time of maximum compression. In this way, the leaf spring 42 resiliently biases the first plate 30 to the second plate 32 side through the first interposition plate 43.

The resin pin 61 of the connection and separation mechanism R1 is provided with a head portion 63 having, for example, a circular cross section, and a shaft portion 64 which is a columnar portion having a smaller diameter than the head portion 63. The cylindrical collar 62 is fitted onto the outer periphery of the shaft portion 64. The outer diameter of the collar 62 is made to be equal to the outer diameter of the head portion 63 of the resin pin 61. A first end portion 621 in the axial direction of the collar 62 comes into contact with the head portion 63 of the resin pin 61, and a second end portion 622 in the axial direction of the collar 62 is received by the upper surface 32a of the second plate 32. In this way, the resin pin 61 and the collar 62 are prevented from dropping to the lower side of the second plate 32.

On the other hand, the first interposition plate 43 is disposed so as to cover the upper side of the head portion 63 of the resin pin 61, whereby the dropout of the resin pin 61 to the upper side is prevented. Further, in the first interposition plate 43, a looking hole 65 which is smaller than the outer diameter of the head portion 63 is formed to face the head portion 63 of the resin pin 61. After the assembly of the connection and separation mechanism R1, by viewing the head portion 63 of the resin pin 61 through the looking hole 65 of the first interposition plate 43, it is possible to easily determine a work defect such as failing to assemble the resin pin 61.

The head portion 63 of the resin pin 61 and most of the collar 62 are inserted into a first hole 66 for the connection and separation mechanism R1, of the first plate 30 of the fixed bracket 23. A portion of the collar 62 protrudes from the first hole 66. A portion 641 protruding from the collar 62, of the shaft portion 64 of the resin pin 61, is inserted into a second hole 67 for the connection and separation mechanism R1, of the second plate 32 of the tilt bracket 24 (the movable bracket). At the time of the secondary collision, as shown in FIGS. 5 and 6, shearing occurs such that the portion 641 of the shaft portion 64 of the resin pin 61 is separated from the rest of the shaft portion 64 according to the relative movement of the first plate 30 and the second plate 32.

Figure 7:
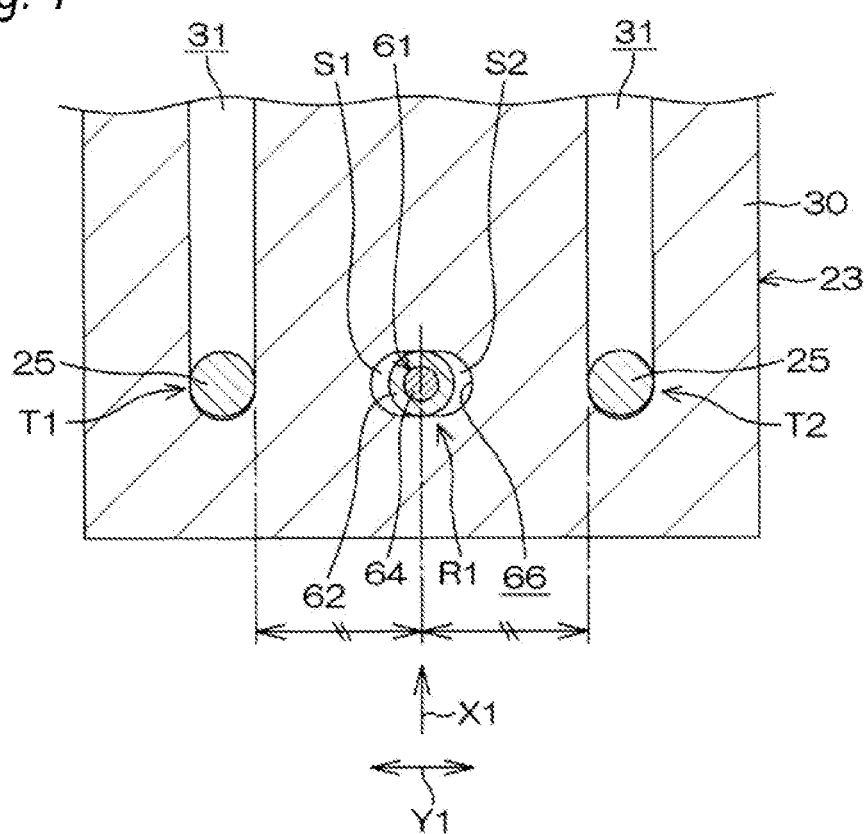
FIG. 7 is a cross-sectional view along line VII-VII of FIG. 2 and shows the cross sections of the first plate and the connection and separation mechanism.

As shown in FIG. 7 which is a cross-sectional view along line VII-VII of FIG. 2, the first hole 66 for the connection and separation mechanism R1 of the first plate 30 is disposed at the middle position between the elongated holes 31 for the suspension mechanisms T1 and T2 in relation to the direction Y1 orthogonal to the column movement direction X1. That is, the resin pin 61 is disposed at the middle position between the pair of suspension bolts 25 in relation to the direction Y1 orthogonal to the column movement direction X1.

Further, the first hole 66 for the connection and separation mechanism R1 of the first plate 30 is formed as a laterally elongated hole which is elongated in the direction Y1 orthogonal to the column movement direction X1. In this way, gaps S1 and S2 are provided between the outer periphery of the collar 62 and the inner periphery of the first hole 66 in relation to the direction Y1 orthogonal to the column movement direction X1.

Since the gaps are present, even if a slight position shift occurs in the first plate 30 and the second plate 32 in the direction Y1 orthogonal to the column movement direction X1 due to some external force during transportation or during assembly, the resin pin 61 is not shorn.

Figure 8:
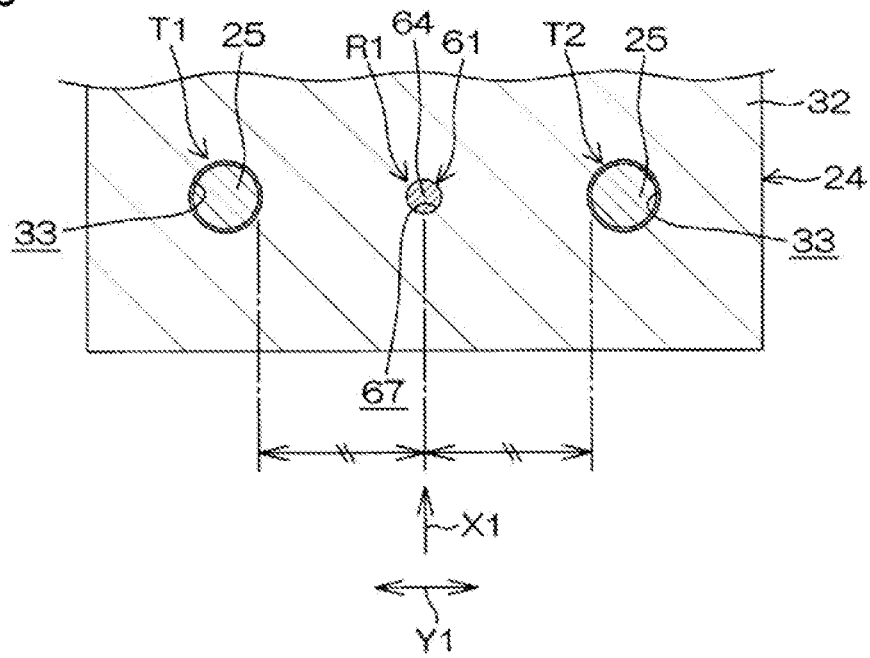
FIG. 8 is a cross-sectional view along line VIII-VIII of FIG. 2 and shows the cross sections of the second plate and the connection and separation mechanism.

As shown in FIG. 8 which is a cross-sectional view along line VIII-VIII of FIG. 2, the second hole 67 for the connection and separation mechanism R1, of the second plate 32 of the tilt bracket 24, is disposed at the middle position between the pair of round holes 33 for the suspension mechanisms T1 and T2 in relation to the direction Y1 orthogonal to the column movement direction X1. The second hole 67 is formed as a circular hole having an inner diameter which is equal to or slightly larger than the outer diameter of the shaft portion 64 of the resin pin 61.

At the time of the secondary collision, the shaft portion 64 of the resin pin 61 is shorn by the shift of the mating faces of the second end portion 622 of the collar 62 and the second plate 32. A shearing blade which is configured with an inner peripheral edge of the second end portion 622 of the collar 62 has an arc shape, and a shearing blade which is configured with an edge portion of the second hole 67 of the second, plate 32 also has an arc shape.

According to the first embodiment, the resin pin 61 which is inserted into the first hole 66 of the first plate 30 and the second hole 67 of the second plate 32, thereby connecting the first plate 30 and the second plate 32, has a predetermined amount of play (equivalent to the gaps S1 and S2) with respect to the first hole 66 in relation to the direction Y1 orthogonal to the column movement direction X1 Therefore, during assembly or during transportation before assembly, even if there is impact that makes the positions of the fixed bracket 23 and the tilt bracket 24 (the movable bracket) shift in relation to the direction Y1 orthogonal to the column movement direction X1, it is possible to suppress the occurrence of the shearing of the resin pin 61. In this way, a shear load of the resin pin 61 at the time of the secondary collision is stabilized, and thus it is possible to suppress variation in a separation load at the time of the secondary collision.

Further an area on the side opposite to the column movement direction X1 side in the peripheral edge of the second hole 67 of the second plate 32 has a cross-sectional shape of an arc shape, as shown in FIG. 8, thereby functioning as a shearing blade which shears the resin pin 61 at the time of the secondary collision. Therefore, at the time of the secondary collision, the resin pin 61 is smoothly shorn without falling (so-called, falling down) in the column movement direction X1 Therefore, it is possible to suppress variation in a separation load.

Further, at the time of the secondary collision, the shaft portion 64 which is a columnar portion having a straight cross-sectional shape, of the resin pin 61, is shorn, and therefore, it is possible to make a shearing area constant, in this way, it is possible to suppress variation in a separation load.

Further, at the time of the secondary collision, the end portion in the axial direction of the collar 62 (made of, for example, metal) having a higher hardness than the resin pin and the peripheral edge of the second hole 67 of the second plate 32 made of metal such as iron function as a pair of shearing blades which shears the resin pin 61 (the shaft portion 64). The end portion in the axial direction of the collar 62 and the peripheral edge of the second hole 67 of the second plate 32, which function as a pair of shearing blades in this manner, are in contact with each other, and therefore, the occurrence of a force to bend the resin pin 61 (the shaft portion 64) at the time of the secondary collision can be suppressed, and thus it is possible to suppress variation in a shear load, and eventually, a separation load.

Further, the connection and separation mechanism R1 which separates, at the time of the secondary collision, the second plate 32 of the tilt bracket 24 (the movable bracket) in the column movement direction X1 from a predetermined position (refer to FIG. 5) of the first plate 30 of the fixed bracket 23 is provided only between the elongated holes 31 composed of a pair of elongated holes in relation to the direction Y1 orthogonal to the column movement direction X1, and therefore, the occurrence of twisting of the tilt bracket 24 with respect to the fixed bracket 23 at the time of the secondary collision is suppressed, and thus it is possible to linearly move the tilt bracket 24 in the column movement direction X1.

Further, at the time of the secondary collision, the resin pin 61 provided as a single pin between the pair of elongated holes 31 in relation to the direction Y1 orthogonal to the column movement direction X1 is shorn, thereby separating the second plate 32 of the tilt bracket 24 from the predetermined position of the first plate 30 of the fixed bracket 23. At the time of the secondary collision, the occurrence of imbalance of moment around the resin pin 61 can be suppressed, whereby the occurrence of twisting of both the brackets 23 and 24 is suppressed, and thus it is possible to linearly move the tilt bracket 24 in the column movement direction X1.

In particular, the connection and separation mechanism R1 is disposed at the middle position between the pair of elongated holes 31 in relation to the direction Y1 orthogonal to the column movement direction X1, and therefore, at the time of the secondary collision, the occurrence of twisting is reliably suppressed, and thus it is possible to reliably linearly move the tilt bracket 24 in the column movement direction X1.

Further, as shown in FIG. 2, the leaf spring 42 which is interposed between the head portion 52 of the suspension bolt 25 and the second plate 32 in a state of bringing the stepped portion 55 of the suspension bolt 25 into contact with the second plate 32 resiliently biases the first plate 30 to the second plate 32 side and the second plate 32 is pinched between the stepped portion 55 and the nut 34. In this way, the first plate 30 and the second plate 32 are fastened to each other. That is, the tightening force of the suspension bolt 25 which is a so-called fastening type does not affect the friction between the first plate 30 and the second plate 32 which relatively move at the time of the secondary collision, and therefore, the management of the tightening torque is easy.

Further, the positional accuracy of the head portion 52 and the stepped portion 55 in a single member such as the suspension bolt 25 is high, and the distance between the head portion 52 and the second plate 32 is regulated by the distance H1 between the head portion 52 and the stepped portion 55 having high positional accuracy, and therefore, it is possible to accurately set the distance between the head portion 52 and the second plate 32. Therefore, it is possible to accurately set the initial load of the leaf spring 42, and therefore, it is possible to suppress variation in a separation load at the time of the secondary collision.

Further, even in a case where the pair of suspension bolts 25 is provided as in the first embodiment, since the suspension bolt 25 is a so-called fastening type, work such as alternately tightening up the pair of suspension bolts 25 is not required, and thus it is possible to significantly reduce the number of assembly steps. Further, work to weld the nut 34 to the second plate 32 or to caulk the nut 34 to the second plate 32 or the suspension bolt 25 is not required, and thus also in this regard, it is possible to reduce the number of assembly steps.

Further, at least one of sliding portions of the first interposition plate 43 interposed between the leaf spring 42 and the first plate 30 and the first plate 30 is configured with a low-friction material, and therefore, at the time of the secondary collision, it is possible to smoothly move the pair of suspension bolts 25, a pair of the leaf springs 42, or the like in the column movement direction X1.

Further, the first interposition plate 43 is a single elongated plate extending in the direction Y1 orthogonal to the column movement direction X1 and making the pair of suspension bolts 25 be inserted thereinto, and therefore, at the time of the secondary collision, it is possible to linearly move the pair of suspension bolts 25 or the like in the column movement direction X1 without causing twisting.

Further the second interposition plate 45 which moves together with the second plate 32 at the time of the secondary collision is interposed between the first plate 30 and the second plate 32, and the surface on at least the first plate 30 side of the second interposition plate 45 is configured with a low-friction material. Further, the third interposition plate 46 which is held by the first plate 30 and relatively moves with respect to the upper surface 32a of the second plate 32 at the time of the secondary collision is interposed between the first plate 30 and the second plate 32, and the surface on at least the second plate 32 side of the third interposition plate 46 slidable with respect to the second plate 32 is configured with a low-friction material.

With the action of the first interposition plate 43, the second interposition plate 45, and the third interposition plate 46, it is possible to more smoothly relatively move the first plate 30 and the second plate 32 at the time of the secondary collision. Therefore, it is possible to more reliably suppress the occurrence of twisting.

The present invention is not limited to the first embodiment and can be implemented as the following second to fourth embodiments.

Second Embodiment

Figure 9:
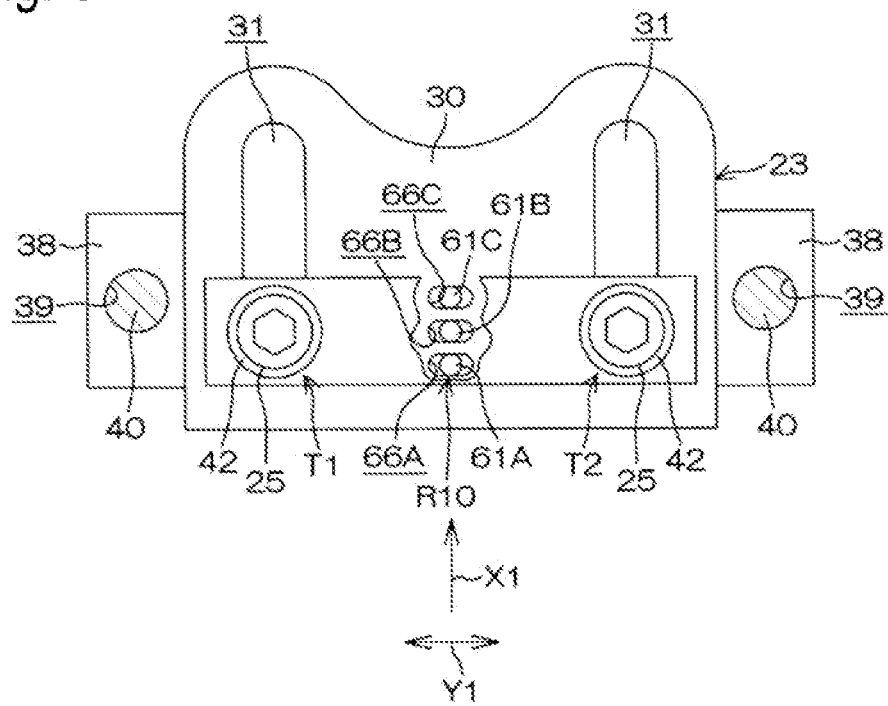
FIG. 9 is a partial cutaway schematic plan view of a fixed bracket, a pair of the suspension mechanisms, and a connection and separation mechanism in a second embodiment of the present invention.

FIG. 9 shows a second embodiment of the present invention. The difference between the second embodiment of FIG. 9 and the first embodiment of FIG. 4 is as follows. Here, in the second embodiment instead of the connection and separation mechanism R1 of the first embodiment of FIG. 4, a connection and separation mechanism R10 which includes a plurality of resin pins 61A, 61B, and 61C provided in a single row lined up in the column movement direction X1, as shown in FIG. 9, is used.

The respective resin pins 61A, 61B, and 61C are respectively inserted into corresponding first holes 66A, 66B, and 66C. The row of the resin pins 61A, 61b, and 61C is disposed at the middle position between the pair of elongated holes 31 in relation to the direction Y1 orthogonal to the column movement direction X1.

Each of the first holes 66A, 66b, and 66C is formed as an elongated hole extending in the direction Y1 orthogonal to the column movement direction X1 and each of the resin pins 61A, 61B and 61C corresponding thereto is fitted thereinto with a predetermined amount of play provided in the direction Y1 orthogonal to the column movement direction X1.

Also in the second embodiment, the same effect as that in the first embodiment of FIG. 4 can be exhibited. Moreover, it is possible to easily set a separation load by the selection of the number of resin pins 61A, 61B, and 61C. In the constituent elements of the second embodiment of FIG. 9, the same constituent elements as the constituent elements of the first embodiment of FIG. 4 are denoted by the same reference numerals as the reference numerals of the constituent elements of the first embodiment of FIG. 4.

Third Embodiment

Figure 10:
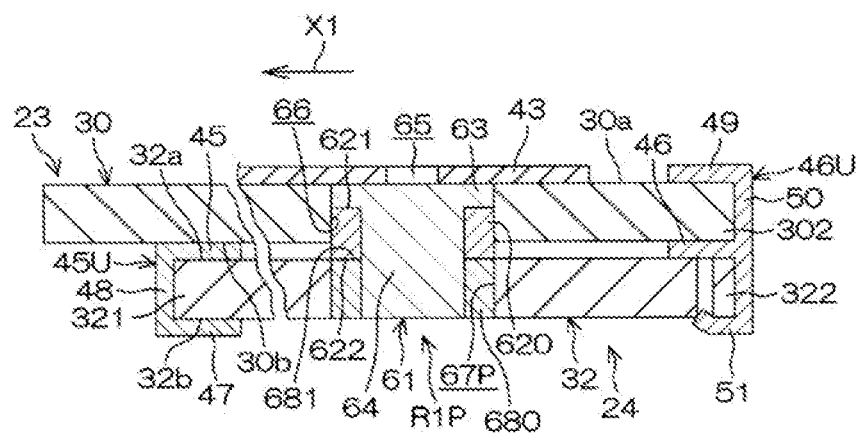
FIG. 10 is a cross-sectional view of a connection state of a first plate and a second plate in a third embodiment of the present invention and shows a cross section in the frontward-rearward direction (the column movement direction) which includes the axis of the resin pin.
Figure 11:
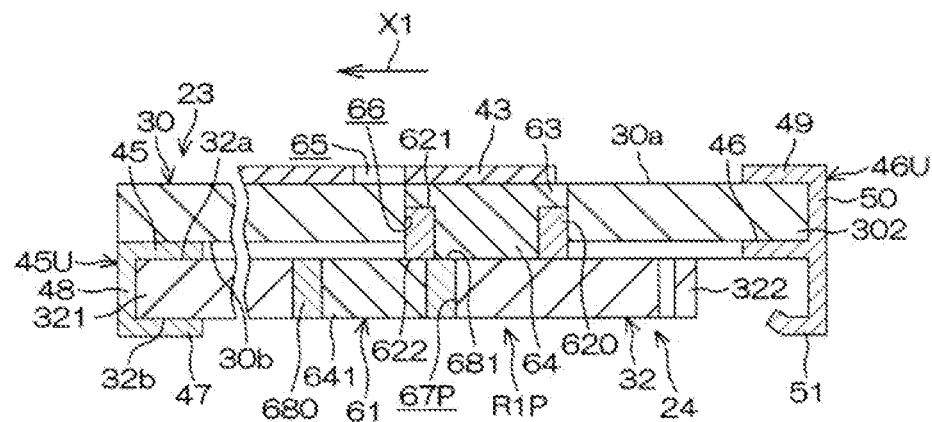
FIG. 11 is a cross-sectional view of the first plate and the second plate at the time of the secondary collision in the third embodiment and shows a state where the second plate has been separated in the column movement direction from a predetermined position of the first plate due to shearing of the resin pin.

FIGS. 10 and 11 show a third embodiment of the present invention. The main difference between the third embodiment shown in FIGS. 10 and 11 and the first embodiment shown in FIGS. 5 and 6 is as follows. Here, in the connection and separation mechanism R1 of the first embodiment shown in FIGS. 5 and 6, the single collar 62 which is inserted into the first hole 66 is used.

In contrast, in a connection and separation mechanism R1P of the third embodiment, as shown in FIG. 10, a first collar 620 which includes an inner periphery that is fitted onto the outer periphery of the shaft portion 64 (the columnar portion) of the resin pin 61, and an outer periphery facing the inner periphery of the first hole 66 of the fixed bracket 23, and a second collar 680 which includes an inner periphery that is fitted onto the outer periphery of the shaft portion 64, and an outer periphery that is fitted onto the inner periphery of a second hole 67P of the second plate 32 of the tilt bracket 24 (the movable bracket) are used. Each of the collars 620 and 680 is formed of a material (for example, metal such as iron or aluminum, high-hardness resin, ceramic, or the like) having a higher hardness than the resin forming the resin pin 61.

The first collar 620 has the same configuration as that of the collar 62 of the first embodiment of FIG. 5. However, the second end portion 622 in the axial direction (the end surface in the axial direction) of the collar 62 of the first embodiment of FIG. 5 is received by the upper surface 32a of the second plate 32, whereas the second end portion 622 in the axial direction (the end surface in the axial direction) of the first collar 620 of the third embodiment is received by only a first end portion 681 in the axial direction (the end surface in the axial direction) of the second collar 680.

That is, the second end portion 622 of the first collar 620 and the first end portion 681 of the second collar 680 are in contact with each other, and thus if the fixed bracket 23 and the tilt bracket 24 relatively move in the column movement direction X1 at time of the secondary collision, as shown in FIG. 11, the facing end portions 622 and 681 of both the collars 620 and 680 function as a pair of shearing blades. In the constituent elements of the third embodiment shown in FIGS. 10 and 11, the same constituent elements as the constituent elements of the first embodiment shown in FIGS. 5 and 6 are denoted by the same reference numerals as the reference numerals of the constituent elements of the first embodiment shown in FIGS. 5 and 6.

According to the third embodiment, at the time of the second collision, the facing end portions (the second end portion 622 and the first end portion 681) of the first and second collars 620 and 630 having a higher hardness than the resin pin 61 function as a pair of shearing blades coming into contact with each other, and therefore, a shearing position and a shearing area (of the shaft portion 64) of the resin pin 61 are stable. Therefore, it is possible to suppress variation in a separation load at the time of the secondary collision. Further, by simply changing the outer diameter (of the shaft portion 64) of the resin pin 61 and the inner diameter of each of the collars 620 and 680, it is possible to adjust the shear load, and eventually, the separation load of the resin pin 61 at the time of the secondary collision without incurring significant manufacturing costs and without changing the specifications of large parts such as the fixed bracket 23 or the tilt bracket 24.

Fourth Embodiment

Figure 12:
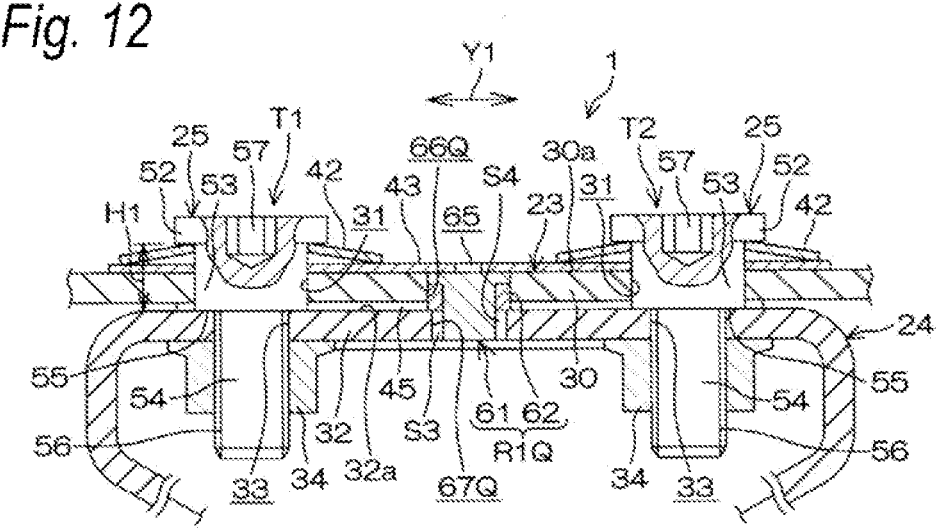
FIG. 12 is a schematic cross-sectional view of a steering device of a fourth embodiment of the present invention.
Figure 13:
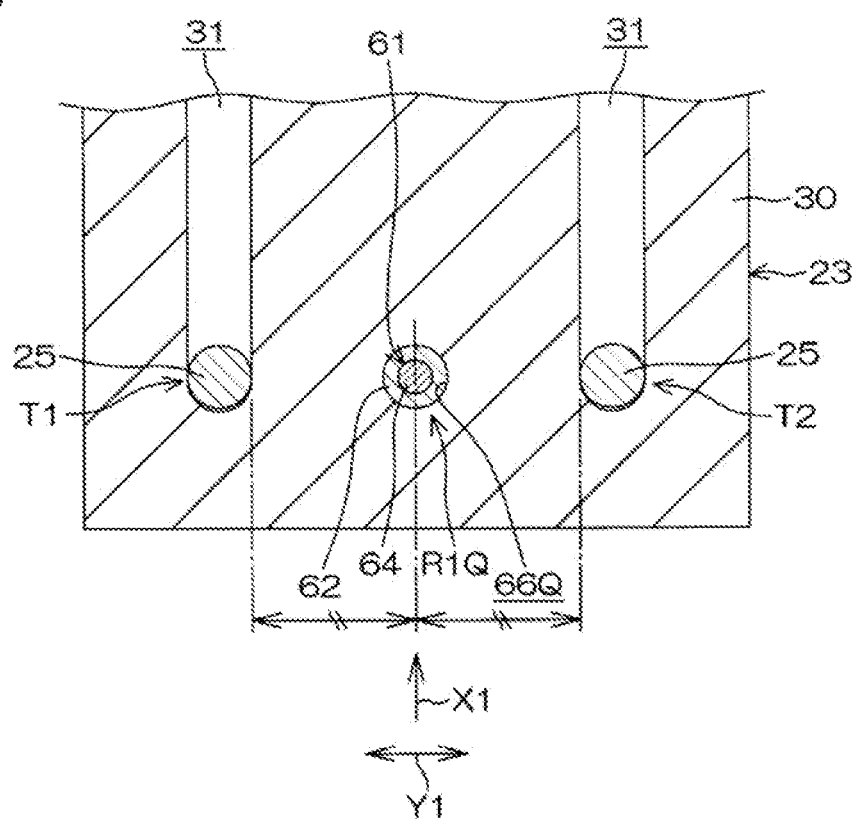
FIG. 13 is a cross-sectional view of a first plate and a connection and separation mechanism in the fourth embodiment.
Figure 14:
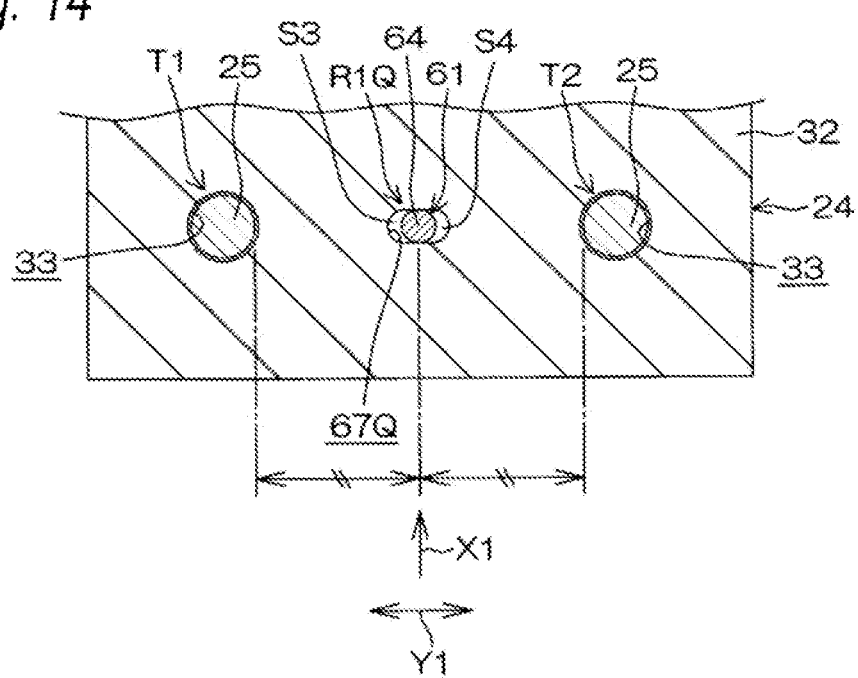
FIG. 14 is a cross-sectional view of a second plate and the connection and separation mechanism in the fourth embodiment.

FIGS. 12 to 14 show a fourth embodiment of the present invention. The difference between the fourth embodiment and the first to third embodiments is as follows. That is, in the first to third embodiments, the first holes 66; 66A to 66C of the first plate 30 are formed as laterally elongated holes which are elongated in the direction Y1 orthogonal to the column movement direction X1, and the second hole 67 of the second plate 32 is formed as a round hole.

In contrast, in the fourth embodiment, as shown in FIGS. 12 and 13, a first hole 66Q for a connection and separation mechanism R1Q of the first plate 30 is formed as a round hole, and as shown in FIGS. 12 and 14, a second hole 67Q of the second plate 32 is formed as a laterally elongated holes which extends in the direction Y1 orthogonal to the column movement direction X1. In this way, gaps S3 and 54 are provided between the shaft portion 64 of the resin pin 61 and the inner periphery of the second hole 67Q in relation to the direction Y1 orthogonal to the column movement direction X1.

Also in this embodiment, even if a slight position shift occurs in the first plate 30 and the second plate 32 in the direction Y1 orthogonal to the column movement direction X1 due to some external force during transportation or during assembly, the resin pin 61 is not shorn.

The present invention is not limited to the first to fourth embodiments, and for example, in the first to fourth embodiments, either of the first hole and the second hole is formed as a laterally elongated holes which extends in the direction Y1 orthogonal to the column movement direction X1, whereas, although not shown in the drawings, both the first hole and the second hole may be formed as a laterally elongated holes which extend in the direction Y1 orthogonal to the column movement direction X1. In addition, various changes can be applied to the present invention within the scope stated in the claims.

According to the present invention, the resin pin which is inserted into the first hole of the first plate and the second hole of the second plate, thereby connecting the first plate and the second plate, has a predetermined amount of play in relation to the direction orthogonal to the column movement direction with respect to at least one of the first hole and the second hole. Therefore, during assembly or during transportation before assembly, even if there is impact that makes the positions of the fixed bracket and the movable bracket shift in relation to the direction orthogonal to the column movement direction, it is possible to suppress the occurrence of the shearing of the resin pin. In this way, a shear load of the resin pin at the time of the secondary collision is stabilized, and thus it is possible to suppress variation in a separation load at the time of the secondary collision.

Further, according to the present invention, at the time of the secondary collsion, an area on the side opposite to the column movement direction side in the peripheral edge of the second hole of the second plate has a cross-sectional shape of an arc shape, thereby functioning as a shearing blade which shears the resin pin. Therefore, at the time of the secondary collision, the resin pin is smoothly shorn without falling (so-called, falling down) in the column movement direction, and therefore, it is possible to suppress variation in a separation load at the time of the secondary collision.

Further, according to the present invention, at the time of the secondary collision, the columnar portion having a straight cross-sectional shape, of the resin pin, is shorn, and therefore, it is possible to make a shearing area constant. In this way, it is possible to suppress variation in a separation load at the time of the secondary collision.

Further, according to the present invention, at the time of the secondary collision, the end portion in the axial direction of the collar and the peripheral edge of the second hole of the second plate function as a pair of shearing blades which shears the resin pin. The end portion in the axial direction of the collar and the peripheral edge of the second hole of the second plate which function as a pair of shearing blades in this manner, are in contact with each other, and therefore, the occurrence of a force to bend the resin pin at the time of the secondary collision can be suppressed, and thus it is possible to suppress variation in a shear load, and eventually, a separation load at the time of the secondary collision, of the resin pin.

Further, according to the present invention, at the time of the second collision, the end portions in the axial direction of the first collar and the second collar function as a pair of shearing blades coming into contact with each other, and therefore, a shearing position and a shearing area of the resin pin are stable. Therefore, it is possible to suppress variation in a separation load at the time of the secondary collision. Further, simply by changing the outer diameter of the resin pin and the inner diameter of each collar, it is possible to adjust the shear load, and eventually, the separation load of the resin pin at the time of the secondary collision without incurring significant manufacturing costs and without changing the specifications of large parts such as the fixed bracket or the movable bracket.

What is claimed is:

1. A steering device comprising:
a fixed bracket which includes a first plate fixed to a vehicle body-side member;
a movable jacket which rotatably supports a steering shaft having a steering member connected to one end of the steering shaft;
a movable bracket which supports the movable jacket so as to move in a column movement direction along with the movable jacket at the time of a secondary collision and includes a second plate facing the first plate;
a suspension mechanism which includes a suspension shaft connecting the first plate and the second plate, thereby suspending the movable jacket through the movable bracket, and is configured to move in the column movement direction along with the second plate at the time of the secondary collision; and
a resin pin which is inserted into a first hole provided in the first plate and a second hole provided in the second plate, thereby connecting the first plate and the second plate, and is configured to be broken at the time of the secondary collision so as to separate the second plate from a predetermined position of the first plate,
wherein the resin pin has a predetermined amount of play in a direction orthogonal to the column movement direction with respect to at least one of the first hole and the second hole.

2. The steering device according to claim 1, wherein the second hole has a cross-sectional shape of an arc shape in at least an area on a side opposite to the column movement direction side.

3. The steering device according to claim 1, wherein
the resin pin includes a columnar portion having a straight cross-sectional shape, and the columnar portion extends over the first hole and the second hole.

4. The steering device according to claim 3, further comprising:
a collar which is fitted onto the columnar portion and inserted into the first hole,
wherein the collar includes an inner periphery which has a circular cross section and is fitted onto an outer periphery of the columnar portion, an outer periphery facing an inner periphery of the first hole, and an end portion in an axial direction, which comes into contact with a peripheral edge of the second hole of the second plate.

5. The steering device according to claim 3, further comprising:
a first collar which includes an inner periphery that is fitted onto an outer periphery of the columnar portion, and an outer periphery facing an inner periphery of the first hole; and
a second collar which includes an inner periphery that is fitted onto the outer periphery of the columnar portion, and an outer periphery that is fitted onto an inner periphery of the second hole,
wherein the first collar and the second collar include end portions in the axial direction, which come into contact with each other.

* * * * *